US009381838B2

United States Patent
Jussli et al.

(10) Patent No.: US 9,381,838 B2
(45) Date of Patent: Jul. 5, 2016

(54) SEATING DEVICE, IN PARTICULAR FLIGHT PASSENGER SEATING DEVICE

(71) Applicant: RECARO Aircraft Seating GmbH & Co. KG, Schwäbisch Hall (DE)

(72) Inventors: Zoltan Jussli, Obersulm (DE); Jürgen Baumann, Bodman-Ludwigshafen (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 113 days.

(21) Appl. No.: 13/654,514

(22) Filed: Oct. 18, 2012

(65) Prior Publication Data

US 2013/0099538 A1    Apr. 25, 2013

(30) Foreign Application Priority Data

Oct. 21, 2011  (DE) .................. 10 2011 116 539

(51) Int. Cl.
| | |
|---|---|
| *A47C 1/03* | (2006.01) |
| *B60N 2/44* | (2006.01) |
| *B64D 11/06* | (2006.01) |
| *B60N 2/22* | (2006.01) |
| *B60N 2/02* | (2006.01) |
| *A47C 1/032* | (2006.01) |

(52) U.S. Cl.
CPC ............ *B60N 2/442* (2013.01); *A47C 1/03205* (2013.01); *B60N 2/02* (2013.01); *B60N 2/22* (2013.01); *B60N 2/44* (2013.01); *B60N 2/4495* (2013.01); *B64D 11/06* (2013.01); *B64D 11/064* (2014.12); *B64D 11/0643* (2014.12)

(58) Field of Classification Search
CPC .. A47C 1/024; A47C 1/03205; A47C 1/0345; A47C 1/0355; B64D 2011/0606; B64D 2011/0648; B64D 11/064; B64D 11/0643; B60N 2/442
USPC .............. 297/83, 85 R, 88, 89, 317, 318, 322
See application file for complete search history.

(56) References Cited

U.S. PATENT DOCUMENTS 2,412,750 A     12/1946  Raitch
3,146,023 A  *   8/1964  Lorenz ................. A47C 1/0345
                                                    297/320

(Continued)

FOREIGN PATENT DOCUMENTS

DE           2655916 C2       7/1977
DE     WO 02066284 A1  *  8/2002  ........... B60N 2/1615

(Continued)

OTHER PUBLICATIONS

German Search Report issued from the German Patent Office dated May 30, 2012 for the corresponding DE patent application No. 10 2011 116 539.1 (partial English translation only).

(Continued)

*Primary Examiner* — Ryan Kwiecinski
(74) *Attorney, Agent, or Firm* — Posz Law Group, PLC

(57) ABSTRACT

A seating device, in particular on a flight passenger seating device includes a moveably mounted primary unit and a moveably mounted secondary unit. The seating device has a locking unit which, depending on at least one operating position of the secondary unit, avoids a movement of the primary unit relative to a mounting unit.

20 Claims, 3 Drawing Sheets

(56) References Cited

U.S. PATENT DOCUMENTS

| | | | |
|---|---|---|---|
| 4,014,507 A | 3/1977 | Swenson | |
| 4,410,215 A * | 10/1983 | McKean | B60N 2/4495 297/423.19 |
| 5,653,498 A * | 8/1997 | Grandfield | 297/85 R |
| 6,227,489 B1 * | 5/2001 | Kitamoto | B64D 11/00 244/118.5 |
| 6,412,870 B1 * | 7/2002 | Higgins et al. | 297/342 |
| 6,543,848 B1 | 4/2003 | Suehiro et al. | |
| 6,742,840 B2 * | 6/2004 | Bentley | B60N 2/22 297/316 |
| 8,201,876 B2 * | 6/2012 | Dowty et al. | 297/85 M |
| 2002/0113477 A1 * | 8/2002 | Uchiyama | A47C 7/506 297/330 |
| 2003/0015893 A1 * | 1/2003 | Hoffman et al. | 297/85 |
| 2010/0072805 A1 * | 3/2010 | Qiu | A47C 1/0355 297/85 R |
| 2011/0215200 A1 * | 9/2011 | Mejuhas | B60N 2/62 244/118.6 |
| 2013/0313867 A1 * | 11/2013 | Kuno | B60N 2/62 297/83 |

FOREIGN PATENT DOCUMENTS

| | | |
|---|---|---|
| DE | 69835019 T2 | 11/2006 |
| DE | 102007012728 A1 | 9/2008 |
| DE | 202009017387 U1 | 5/2010 |
| GB | 2476385 A | 6/2011 |
| WO | 2010/086822 A1 | 8/2010 |

OTHER PUBLICATIONS

German Search Report issued from the German Patent Office dated May 30, 2012 for the corresponding DE patent application No. 10 2011 116 539.1.

Extended European Search Report dated May 22, 2015 issued in corresponding EP patent application No. 12007251.7.

* cited by examiner

SEATING DEVICE, IN PARTICULAR FLIGHT PASSENGER SEATING DEVICE

CROSS REFERENCE TO RELATED APPLICATION

This application is and is based on and incorporates herein by reference German Patent Application No. 10 2011 116 539.1 filed on Oct. 21, 2011.

PRIOR ART

A seating device, in particular a flight passenger seating device, with a moveably mounted primary unit and with a moveably mounted secondary unit, is already known.

The invention is based in particular on the object of increasing safety for a passenger or a flight passenger in the event of a crash.

ADVANTAGES OF THE INVENTION

The invention is based on a seating device, in particular on a flight passenger seating device, with a moveably mounted primary unit and with a moveably mounted secondary unit.

It is proposed that the seating device has a locking unit which, depending on at least one operating position of the secondary unit, avoids a movement of the primary unit relative to a mounting unit, as a result of which, in the event of a crash, particularly high forces can be transmitted from the primary unit into the mounting unit. In this connection, "moveably mounted" is intended to be understood in particular as meaning at least one degree of freedom relative to the mounting unit. In this connection, a "primary unit" is intended to be understood in particular as meaning a unit which is provided in order to moveably mount the secondary unit. The primary unit preferably has a seat part. In this connection, a "secondary unit" is intended in particular to be understood as meaning a unit which is provided in order to support a body portion of a flight passenger using the seating device. In this case, the secondary unit may comprise a backrest, an armrest and/or particularly preferably a foot rest. In this connection, a "locking unit" is intended to be understood in particular as meaning a unit which, in at least one operating state, blocks at least one degree of freedom between two components and, in at least one further operating state, releases the at least one degree of freedom. In at least one operating state, the locking unit preferably blocks all of the degrees of freedom between the two components. In this connection, an "operating position" is intended to be understood in particular as meaning a position into which a component can be moved. At least one operating position is preferably a locking position. In this connection, a "mounting unit" is intended to be understood in particular as meaning a unit which is captively securable on a floor and is provided in order to mount the primary unit relative to the floor. The mounting unit may preferably have seat feet, a supporting tube unit and/or one or more seat parts and may connect a plurality of adjacent aircraft seats of a seat row to one another. "Provided" is intended to be understood in particular as meaning specially programmed, designed and/or equipped.

In a further refinement of the invention, it is proposed that the locking unit avoids a movement of the primary unit relative to the mounting unit, depending on at least one operating position of the primary unit, thus enabling a further increase in operating safety.

Furthermore, it is proposed that the locking unit has a locking means which is mounted pivotably on the mounting unit, thus making it possible to achieve a particularly simple and secure locking mechanism. In this connection, a "locking means" is intended in particular as meaning a means which is provided in order to drive a locking mechanism.

If the seating device has a pivotable seat foot unit which is provided in order, in a locked state, to form a form-fitting connection with a locking bolt of the locking unit, further locking components can advantageously be avoided. In this connection, a "seat foot unit" is intended as meaning in particular a unit which forms a seat foot of the seating device.

Furthermore, it is proposed that the seating device has a slotted guide mechanism in which the locking bolt of the mounting unit is guided, as a result of which a guide and/or a stop for the locking bolt can be achieved in a particularly simple manner.

Furthermore, it is proposed that the locking unit has a spring element which is provided to steer the locking means into a predefined starting position, as a result of which the locking means can be kept securely in the starting position, in particular in the event of vibration and/or turbulence.

In a further refinement of the invention, it is proposed that the secondary unit has a bearing means which, in at least one operating position, bears against a locking means of the locking unit. As a result, the locking means can be deflected in a particularly simple manner by the secondary unit, in particular even counter to a spring force.

A particularly simple construction with high seating comfort of the seating device can be achieved if the primary unit has a seat base which is mounted so as to be at least linearly displaceable relative to the mounting unit.

Seating comfort of the seating device can be increased further if the primary unit has a seat base which is mounted so as to be at least pivotable relative to the mounting unit.

If the seat foot unit has at least one seat foot means which is mounted pivotably on the mounting unit and on the primary unit and is provided in order, in a locked state, to conduct away forces from the primary unit into the mounting unit, additional components supporting the primary unit can be omitted.

If the secondary unit comprises a leg rest which is mounted pivotably about a pivot axis, seating comfort for a flight passenger can advantageously be further increased.

If the pivot axis is arranged in a fixed position on the primary unit, a simple pivoting connection of the pivoting connection of the leg rest to the primary unit can be achieved.

In a further refinement of the invention, it is proposed that the seating device has a backrest unit which is mounted pivotably on the primary unit. This enables seating comfort for a flight passenger to be further increased.

DRAWING

Further advantages emerge from the description below of the drawing. The drawing illustrates an exemplary embodiment of the invention. The description and the claims contain numerous features in combination. A person skilled in the art will expediently also consider the features individually and combine them into meaningful further combinations.

DESCRIPTION OF THE EXEMPLARY EMBODIMENT

Figure 1:
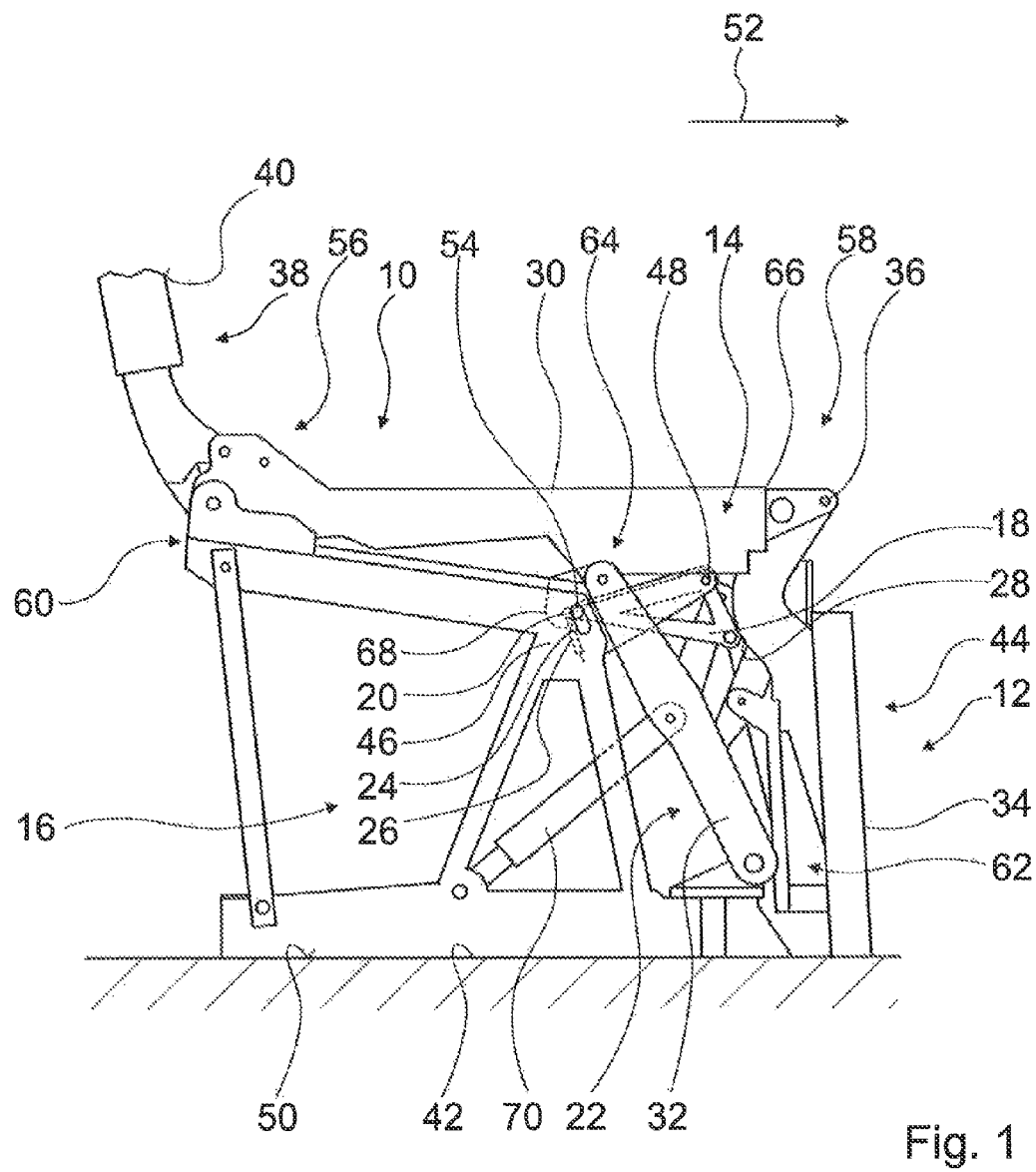
FIG. 1 shows a side view of a seating device in a locked state.

FIG. 1 shows a seating device according to the invention, designed as a flight passenger seating device, in a side view. In this connection, it is likewise conceivable to use the seating device in other locomotion means, for example in motor vehicles or passenger ships. The use of the seating device in buildings is in principle also conceivable. The seating device is in an upright, locked position, known to a person skilled in the art as the TTL position, which has to be adopted during takeoff, landing and taxiing for safety reasons.

The seating device has a moveably mounted primary unit 10 on which a moveably mounted secondary unit 12 is arranged. The primary unit 10 has a seat base 30. In this connection, however, it is also conceivable for the primary unit 10 to comprise a different component appearing expedient to a person skilled in the art, such as, for example, a foot rest, a backrest or an armrest. The secondary unit 12 is formed by a foot support unit. In this connection, however, it is also conceivable for the secondary unit to be formed by a different component appearing expedient to a person skilled in the art, such as, for example, a seat base, a backrest or an armrest.

In the locked state, the primary unit 10 is coupled immovably to a mounting unit 16. The mounting unit 16 is connected captively and immovably to a cabin floor 42. The secondary unit 12 is connected to the primary unit 10 via a pivot axis 36. An electric drive unit 44 maintains a set position of the secondary unit 12 relative to the primary unit 10. In this connection, hydraulic and/or manually operated drive units for adjusting and fixing the set position of the secondary unit 12 are also conceivable. The secondary unit 12 comprises a leg rest 34 which is mounted pivotably about the pivot axis 36. The pivot axis 36 is arranged in a fixed position on the primary unit 10.

The seating device has a locking unit 14. The locking unit 14 avoids a movement of the primary unit 10 relative to the mounting unit 16 depending on an operating position of the secondary unit 12. In FIG. 1, the secondary unit 12 is in a locking position. Furthermore, the primary unit 10 is in a locking position.

For the locking of the primary unit 10, the locking unit 14 has a locking means 18 designed as a triangular lever arm and a locking bolt 20 arranged at one end of the locking means 18. The locking means 18 is mounted on a mounting leg 46 of the mounting unit 16 so as to be pivotable about a pivot axis 48. The pivot axis 48 in this case runs parallel to a mounting plane 50 and perpendicular to a seating direction 52. The seating direction 52 here runs parallel to the cabin floor 42 and, in an upright position of the seating device, perpendicular to a front edge of the seat base 30, wherein the front edge of the seat surface serves to support a lower part of the thighs and knee region of a seated passenger. The seating direction 52 may correspond to the direction of transport of the transport means. In particular in the event of use in an aircraft cabin, the seating direction 52 corresponds to a flight direction. In the case of use in a railway carriage, a tour bus or a passenger ship, the seating direction may be oriented counter to the transport direction or transversally with respect thereto.

In a rear region 56, the seat base 30 is guided on the mounting unit 16 via a linear guide unit 60. In an unlocked state, the seat base 30 is moveable linearly relative to the mounting unit 16 and so as to be pivotable at the same time. In a front region 58 of the seat base 30, the seat base 30 is connected to a pivotable seat foot unit 22. The seat foot unit 22 has a seat foot means 32 which is mounted pivotably on the mounting unit 16 at an end 62 facing the cabin floor 42. At an end 64 facing away from the cabin floor 42, the seat foot means 32 is connected pivotably to the seat base 30. Therefore, during a linear movement of the seat base 30 in the seating direction 52 relative to the mounting unit 16, a front seat edge 66 of the seat base 30 executes a substantially curved movement.

The locking bolt 20 describes a circular path 54 during a locking and unlocking operation. The locking bolt 20 is guided in a slotted guide mechanism 24. The slotted guide mechanism 24 is arranged within the mounting leg 46. The slotted guide mechanism 24 limits the pivotability of the locking bolt 20. The secondary unit 12 has a bearing means 28 which, in a locked state, bears against the locking means 18 of the locking unit 14. The bearing means 28 exerts a force on the locking means 18, which force is oriented substantially counter to the seating direction 52. Via the pivot axis 48, the locking bolt 20 is thus steered in the direction of the seat base 30. In the locked state, the locking bolt 20 bears against an upper end of the slotted guide mechanism 24.

The locking unit 14 furthermore has a spring element 26 which is arranged on the locking means 18 and on the mounting unit 16. The spring element 26 exerts a force on the locking means 18, which force acts counter to the force exerted by the bearing means 28. In this case, the spring element 26 is formed by a tension spring. However, it is also conceivable in this connection to use other spring elements appearing expedient to a person skilled in the art, such as, for example, gas-filled compression springs, helical springs, bending springs and/or torsion springs.

In the locked state shown, the locking bolt 20 engages behind a locking stop 68 which is formed integrally with the seat foot means 32. The seat foot means 32 bears at the rear against the mounting leg 46 of the mounting unit 16. The locking bolt 20 bears in a form-fitting manner against the seat foot means 32 and against the locking stop 68. The bearing against the locking stop 68 avoids a pivoting movement of the seat foot means 32. Forces which are exerted by the seat base 30, in particular in a seating direction 52 in the event of a crash, are transmitted directly via the locking unit 14 into the mounting unit 16. The seat foot means 32 is therefore relieved of load in the TTL position.

Figure 2:
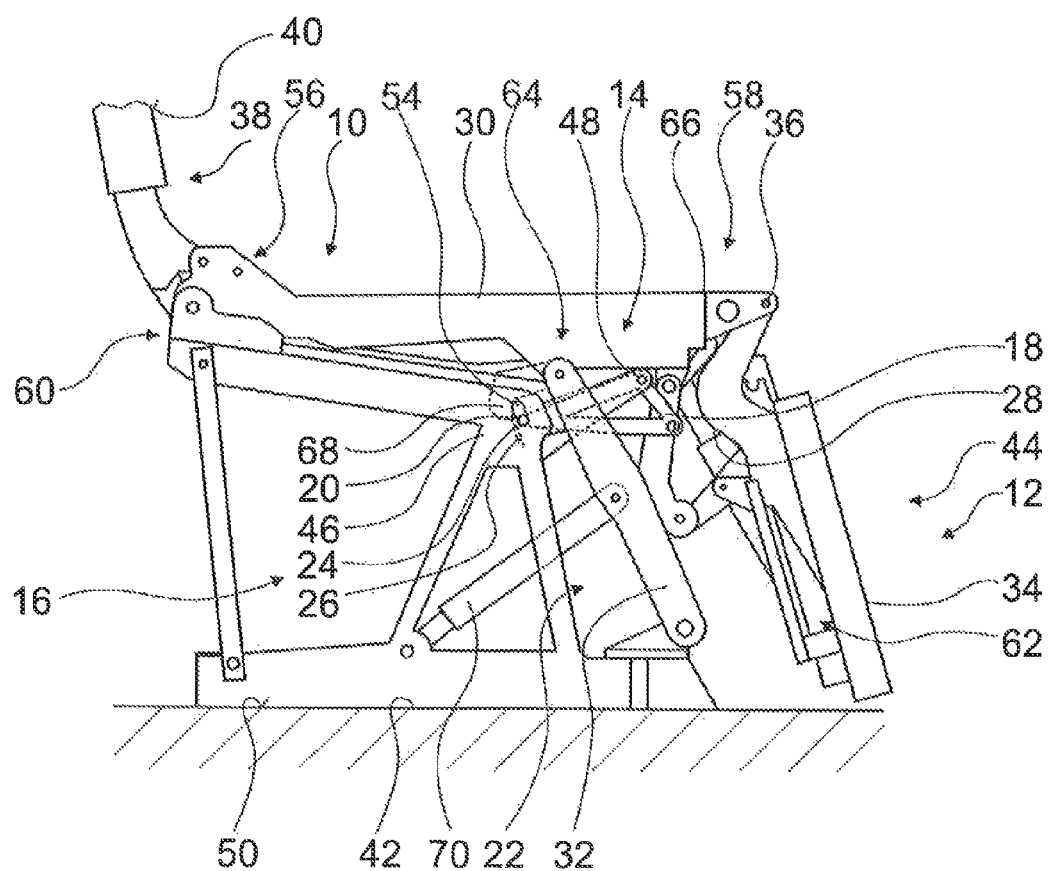
FIG. 2 shows a side view of the seating device according to FIG. 1 in an unlocked state.

In order to move the seat from the TTL position shown in FIG. 1 into a comfort position, the leg rest 34 of the secondary unit 12 is pivoted about the pivot axis 36 in a first unlocking step (FIG. 2). In the process, the bearing means 28 moves substantially in the seating direction 52 and releases the locking means 18. The locking means 18, driven by a spring force produced by the spring element 26, pivots about the pivot axis 48. In this case, the locking bolt 20 moves away from the seat base 30 and releases the form-fitting connection with the locking stop 68 of the seat foot means 32. The primary unit 10 which is mounted pivotably on the seat foot means 32 is therefore likewise unlocked and can be guided in the seating direction 52 in a further pivoting operation. For this purpose, a hydraulic drive unit 70 moves the seat foot means 32 and consequently the primary unit 10 into the comfort position. In this connection, electric and/or manually operated drive units for adjusting and fixing of the set position of the primary unit 10 are also conceivable.

Figure 3:
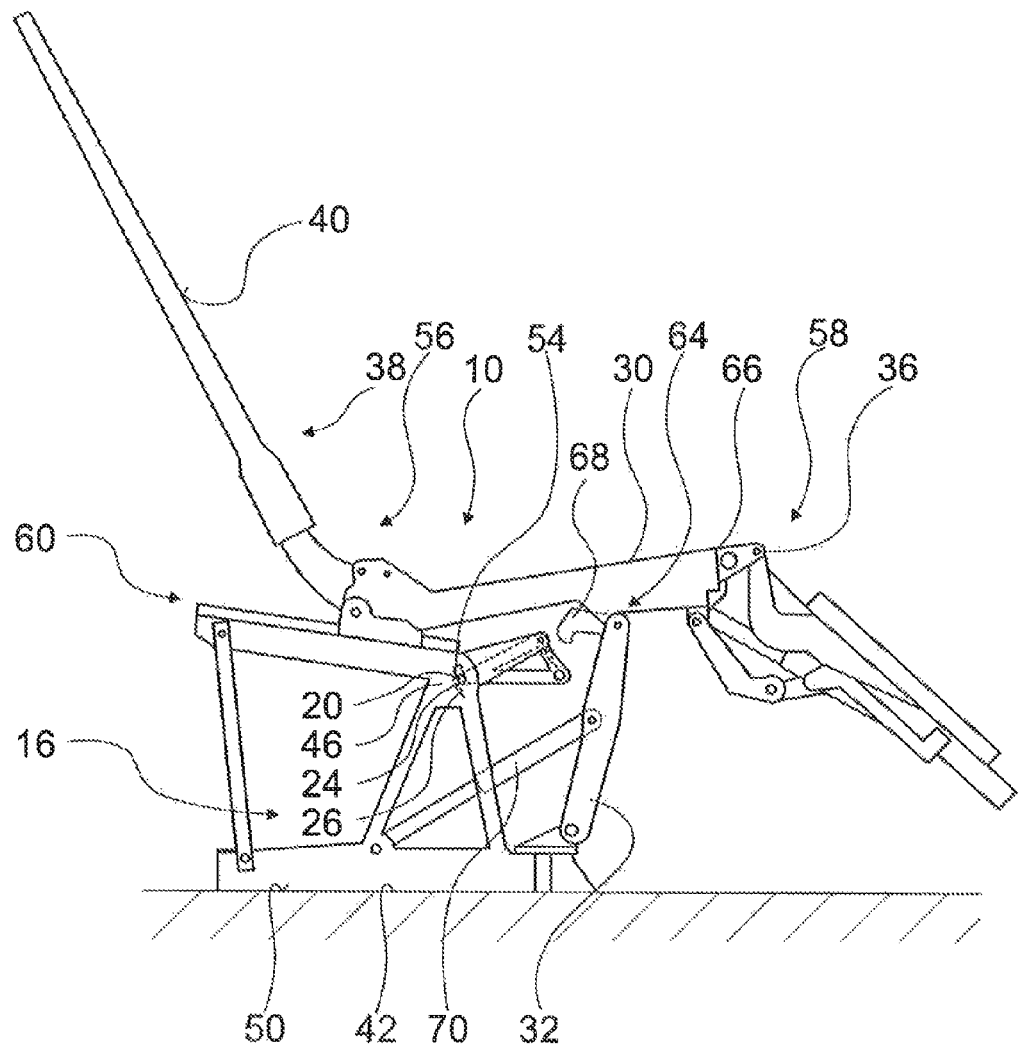
FIG. 3 shows a side view of a seating device according to FIG. 1 in a comfort position.

FIG. 3 shows the seating device in a comfort position. The seat base 30 is displaced in the seating direction 52. The seating device has a backrest unit 38 which comprises a back supporting surface 40 which is provided for supporting a seated passenger's back. The back supporting surface 40 is in the TTL position in a substantially upright position. When the seating device is moved into the comfort position, the backrest unit 38 is inclined together with the seat base 30.

The seating device is moved back into the locked state in a correspondingly reversed sequence. First of all, the seat base 30 moves counter to the seating direction 52 into the TTL position. Subsequently, the leg rest 34 moves back into the TTL position and, in the process, presses the locking means 18 by means of the bearing means 28 into the locking position counter to the spring force of the spring element 26. The locking bolt 20 engages behind the locking stop 68.

REFERENCE NUMBERS

10 Primary unit
12 Secondary unit
14 Locking unit
16 Mounting unit
18 Locking means
20 Locking bolt
22 Seat foot unit
24 Slotted guide mechanism
26 Spring element
28 Bearing means
30 Seat base
32 Seat foot means
34 Leg rest
36 Pivot axis
38 Backrest unit
40 Back supporting surface
42 Cabin floor
44 Drive unit
46 Mounting leg
48 Pivot axis
50 Stand plane
52 Seating direction
54 Circular path
56 Region
58 Region
60 Linear guide unit
62 End
64 End
66 Seat edge
68 Locking stop
70 Drive unit

The invention claimed is:

1. A flight passenger seating device comprising:
a mounting unit immovably fixed to a cabin floor;
a primary unit including a seat base movably mounted on the mounting unit and having a plurality of operating positions, the movably mounted seat base moving linearly relative to the mounting unit;
a secondary unit including a foot support unit movably mounted on the mounting unit and having a plurality of operating positions; and
a locking unit interacting with the secondary unit and avoiding movement of the primary unit relative to the immovably fixed mounting unit in at least one operating position of the plurality of operating positions for the secondary unit, the locking unit having a locking means which is mounted pivotably on the mounting unit and having a locking bolt arranged at one end of the locking means, the locking bolt engages behind a locking stop of a seat foot means in a locked state, whereby forces which are exerted by the seat base due to a crash are transmitted directly via the locking unit into the mounting unit.

2. The seating device according to claim 1, wherein the locking unit avoids a movement of the primary unit relative to the mounting unit, depending on at least one operating position of the primary unit.

3. The seating device according to claim 2, wherein a pivotable seat foot unit is provided in order, in a locked state, to form a form-fitting connection with the locking bolt of the locking unit.

4. The seating device according to claim 2, wherein the secondary unit has a bearing means which, in at least one operating position, bears against the locking means of the locking unit.

5. The seating device according to claim 1, further comprising a pivotable seat foot unit provided in order, in a locked state, to form a form-fitting connection with the locking bolt of the locking unit.

6. The seating device according to claim 5, further comprising a slotted guide mechanism in which the locking bolt of the mounting unit is guided.

7. The seating device according to claim 1, wherein the locking unit has a spring element which is provided to steer the locking means into a predefined starting position.

8. The seating device according to claim 1, wherein the secondary unit has a bearing means which, in at least one operating position, bears against the locking means of the locking unit.

9. The seating device according to claim 1, wherein the seat base of the primary unit is mounted to be at least pivotable relative to the mounting unit.

10. The seating device at least according to claim 1, wherein a seat foot unit having at least one of the seat foot means is mounted pivotably on the mounting unit and on the primary unit and is provided in order, in a locked state, to conduct away forces from the primary unit into the mounting unit.

11. The seating device according to claim 1, wherein the secondary unit comprises a leg rest which is mounted pivotably about a pivot axis.

12. The seating device according to claim 11, wherein the pivot axis is arranged in a fixed position on the primary unit.

13. The seating device according to claim 1, further comprising a backrest unit which is mounted pivotably on the primary unit.

14. The seating device according to claim 1, wherein the secondary unit comprises a leg rest which is mounted pivotably about a pivot axis between a closed position and a comfort position, and wherein in the closed position the seating device is in an upright position and the leg rest is adjacent the mounting unit, and wherein in the comfort position the leg rest is pivoted a furthest amount away from the mounting unit.

15. The seating device according to claim 14, wherein the at least one operating position of the plurality of operating positions for the secondary unit is selected from any position of the leg rest from the closed position up to and before the comfort position.

16. The seating device according to claim 1, wherein the locking stop is formed integrally with the seat foot means.

17. The seating device according to claim 1, wherein the locking bolt bears in a formfitting manner against the seat foot means and against the locking stop.

18. The seating device according to claim 1, wherein the locking means is designed as a triangular lever arm.

19. The seating device according to claim 1, wherein the locking bolt is guided in a slotted guide mechanism which limits the pivotability of the locking bolt.

20. A seat with a seating device according to claim 1.

* * * * *